(12) United States Patent
Wullert, II

(10) Patent No.: US 6,975,709 B2
(45) Date of Patent: Dec. 13, 2005

(54) TRIGGERED PLAYBACK OF RECORDED MESSAGES TO INCOMING TELEPHONE CALLS TO A CELLULAR PHONE

(75) Inventor: John R. Wullert, II, Martinsville, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 282 days.

(21) Appl. No.: 10/616,146

(22) Filed: Jul. 8, 2003

(65) Prior Publication Data

US 2005/0008129 A1    Jan. 13, 2005

(51) Int. Cl.⁷ ............................................... H04M 1/64
(52) U.S. Cl. .................. 379/88.23; 455/413; 455/567
(58) Field of Search ..................... 379/88.12, 88.22, 379/88.26, 93.23, 210.01, 211.02; 455/412.1, 455/567

(56) References Cited

U.S. PATENT DOCUMENTS 6,028,922 A  *  2/2000  Deutsch et al. ........ 379/211.02
6,246,889 B1 *  6/2001  Boltz et al. ................. 455/567

* cited by examiner

Primary Examiner—Fan Tsang
Assistant Examiner—Gerald Gauthier
(74) Attorney, Agent, or Firm—David A. Hey; James W. Falk

(57) ABSTRACT

The present invention provides system and method for delayed answering of a call to a cellular phone which can operate in either a distributed or a centralized manner. In particular, the system and method according to the present invention allows the cellular phone user upon receiving a call to play a message to the caller, such as informing the caller to "hold on" for a short time and that the user will be available shortly. The present invention provides a number of advantageous alternatives to provide a cellular phone user flexibility in answering incoming calls.

4 Claims, 3 Drawing Sheets

TRIGGERED PLAYBACK OF RECORDED MESSAGES TO INCOMING TELEPHONE CALLS TO A CELLULAR PHONE

BACKGROUND OF THE INVENTION

The present invention relates to improved features for cellular telephones.

The tremendous growth in the use of cellular telephones has greatly increased the probability that people will receive telephone calls when they are in public places, such as meetings, movie theaters and retail stores. Answering such calls in such public places can create problems for the person receiving the call. For example, the person receiving the call may not want to interrupt and disturb an important meeting by answering the phone call, or disturb other people who may be trying to watch a movie, or other public performance. Further, the person may want to preserve privacy by not answering the call until they are in a more private place. In addition, the environment may be too noisy for successful communication and the receiving telephone user may want to get to a quieter setting before answering. For all these reasons, people receiving calls in public places may wish to delay answering the call.

However, if there is a delay in answering the call, or the call is connected without the receiving party speaking into the phone, the caller may disconnect, thinking that the call attempt failed.

This set of circumstances creates the current situation where people are forced to rush out of the public place with the telephone ringing or buzzing, or to answer the call with a quickly spoken 'hold on' message and then get to a more private place as soon as possible.

Therefore, there remains a need in the field for improvements in delayed answering of calls to cellular phones.

DISCUSSION OF PRIOR ART

There are several patents that have some relevance to the present invention, but none which teach or suggest the present invention.

In particular, U.S. Pat. No. 5,844,967 Method for automatically transmitting greeting message from receiving telephone in an automatic answering system, describes a system in which a telephone with the ability to play a recorded greeting when the person lifts the handset. The focus of this patent is to assist receptionists and operators who recite the same greeting many times a day.

U.S. Pat. No. 4,734,930 Voice recording apparatus, is similar to the patent above, in that it provides a system whereby an operator/receptionist can play back a recorded greeting to avoid repetition throughout the day. This patent specifically relates to a PBX environment.

U.S. Pat. No. 5,029,198 Telephone call responding system and control method and device therefore, describes a system and method wherein a person receiving a telephone call can respond to a caller by one of several different recorded messages without actually answering the call. The primary focus is to aid in screening of unwanted telephone calls.

U.S. Pat. No. 5,189,692 Telephone operator simulator, describes a system for playing a variety of recorded messages to a caller based upon the caller's response to previous messages. The receiving party can listen to the responses and send further messages or answer the caller.

U.S. Pat. No. 5,422,937 Remotely controlled telephone operator simulator, describes a system wherein a call is forwarded to a remote alternate terminal device, from which greeting messages could be played. The called party interacts with the remote terminal device using a two-line telephone.

U.S. Pat. No. 5,539,818 Telephonic console with prerecorded voice message and method, describes a system having a portable voice message unit programmed to control playback of recorded messages.

None of the prior art above addresses the problem noted with respect to use of cellular phones in public places. Therefore, there remains a need in the art for improvements as represented by the present invention.

SUMMARY OF THE INVENTION

The present invention provides system for delayed answering of a call to a cellular phone. The system according to the present invention can operate in either a distributed or a centralized manner.

The present invention also provides a number of advantageous alternatives to provide a cellular phone user flexibility in answering incoming calls.

DETAILED DESCRIPTION OF THE INVENTION

Figure 1:
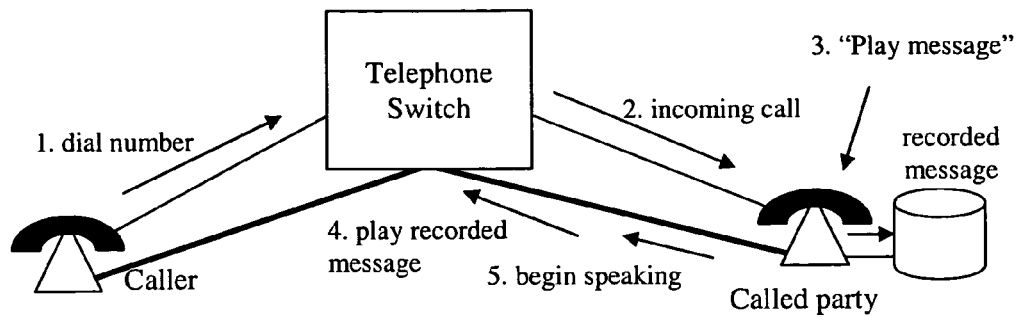
FIG. 1 is a diagrammatic representation of one embodiment according to the present invention, showing participating entities and message flow in a distributed system.

The present invention provides system for delayed answering of a call to a cellular phone. In particular, the system according to the present invention allows the cellular phone user upon receiving a call to play a message to the caller. This message may indicate that the caller should "hold on" for a short time and that the user will be available shortly, or some other appropriate message.

As noted above, the system according to the present invention can operate in either a distributed or a centralized manner. In the distributed case, the recorded audio message can be stored within the telephone itself, and the user can press a button on the telephone that causes the telephone to accept the incoming call and then play the recorded message. The connection with the caller is kept open after playing the message, so that the user can begin speaking with the caller at any time after the message ends, or in an alternative, the user can interrupt the message.

In the centralized case, the recorded message is stored on a voice peripheral connected to a telephone network. The user still pushes a button on the telephone to connect the call, but in this case the telephone sends a signal to a network switching system, which then connects the call to the voice peripheral to play the message to the caller. The signaling between the telephone and the network equipment can be accomplished through in-band signaling, in which case the telephone answers the call, and then triggers the network using touch-tones or flashes of the switch hook, or the like. The connection would best be set up as a three-way bridge, between the voice peripheral, the caller and the user, so that the user can begin speaking with the caller at any time, even before the recorded message is finished.

Alternatively, out-of-band signaling can be used without connecting the call to the called party's phone, if an appropriate signaling channel exists. In this case, the network switching system connects the user to the caller when the user answers the call. This connection may be a bridged connection including the voice peripheral, allowing the recorded message to continue playing until the user interrupts, or the switching system may disconnect the caller from the voice peripheral and connect the caller directly to the user.

The present invention also provides a number of advantageous alternatives to provide a cellular phone user flexibility in answering incoming calls.

For example, in the above discussion of the present invention, the user pushes a button on the telephone to initiate playing of the message. However, the present invention also contemplates greater automation of the message trigger, which can eliminate the need for user input at the time of the call. In one embodiment of the present invention, the user establishes an order for the message to be played for all incoming calls. In particular, in a distributed system, the user may enter a command through the phone keys before entering a meeting, which would instruct the telephone to play the recorded message to all callers. Following the meeting, the user could return the telephone to normal operation through another command entry.

Similarly, in a centralized system, the user can interact with control logic within a service control point or within the telephone switch, indicating that the message should be played to all callers. This interaction can be conducted in a variety of ways, such as by using the telephone, by sending an electronic message or through interface with a web page. When a network switching system knows in advance that the message is to be played, the recorded message can actually be played to the caller before hearing the ring-back signal that indicates the user's telephone is ringing.

In a further embodiment of the present invention, the user's phone has the ability to interact with the user's electronic calendar to schedule times for the telephone to automatically switch to the triggered message mode of operation. For example, in a distributed system, a software program running within the phone can gather information from the user's electronic calendar entries, stored within the phone, and the telephone can then automatically play the message to all callers when the calendar indicates that the user is busy. In addition, the telephone can automatically alter the alerting signal, e.g. changing to vibration mode, at the same time.

Similarly, in a centralized system, if the user's electronic calendar information is available to the network system, the message can be enabled during appropriate scheduled events. Alternatively, telephone could send a signal to the network system to enable the playing of the message, based on entries in the phone calendar schedule.

In still further embodiments of the present invention, the user's telephone or the network system can automatically place the phone in message mode when the user is in a certain location. The locations may be either dictated by the entity responsible for the location or be user designated. For example, movie theaters could have signaling equipment which would automatically switch the phone to message mode when the user enters. Alternatively, the user can specify the locations, such as a favorite restaurant or church, so that upon entering such location, the phone is automatically switched to message mode.

The present invention also contemplates that different callers can receive different messages. The user can define lists of potential callers and assign different messages or actions for each list. Callers on one list might receive a "hold on" type message and then have the call connected, as describe above. Other callers might be given a message asking for a PIN or security code, so that the user would be alerted only if the code was entered correctly. Still other callers might be given an "I'm busy" message and then be disconnected or routed to voice mail.

The drawing figures provide diagrammatic representations of these entities and message flows for different embodiments of the present invention as more fully described below.

In particular, FIG. 1 is a diagrammatic representation of one embodiment according to the present invention, showing participating entities and message flow in a distributed system. In this embodiment, the following steps are carried out to implement and use the message mode.

As a preliminary step, the user records greeting into the telephone memory.

Step 1. The caller dials the phone number of the user;

Step 2. A telephone switch sends a ring signal to the user's telephone;

Step 3. The user instructs the telephone to play the recorded message;

Step 4. The call is connected and the message is played to the caller after which the connection is kept open;

Step 5. The user begins speaking with the caller at anytime.

Figure 2:
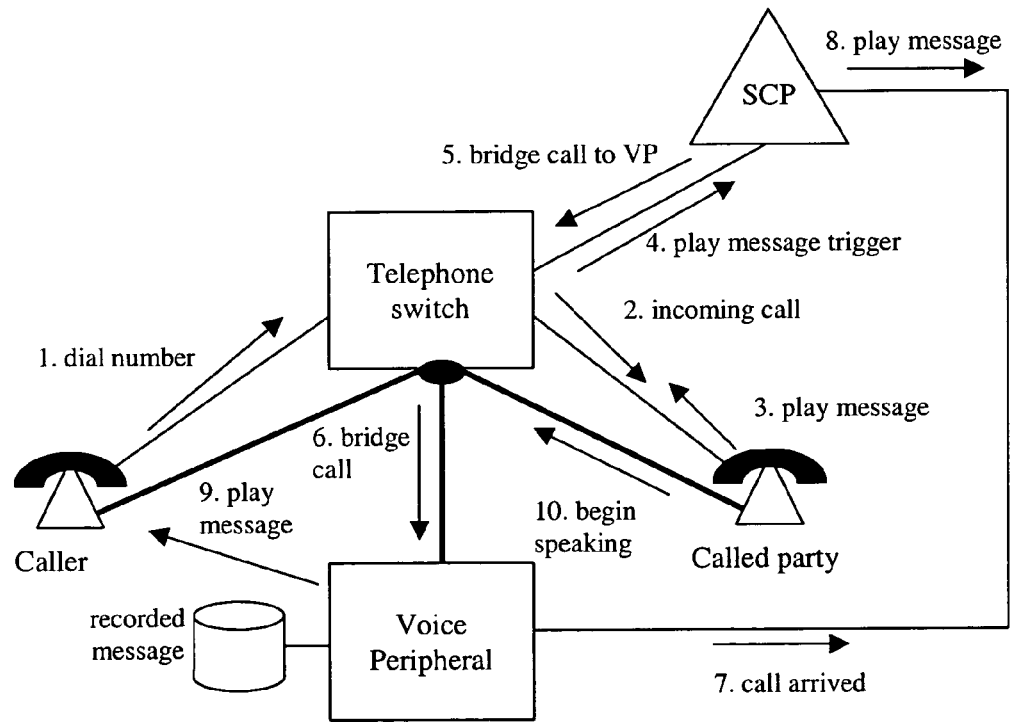
FIG. 2 is a diagrammatic representation of a further embodiment according to the present invention, showing participating entities and message flow in a centralized system.

FIG. 2 is a diagrammatic representation of a further embodiment according to the present invention, showing participating entities and message flow in a centralized system. In this embodiment, the following steps are carried out to implement and use the message mode.

As a preliminary step, the user connects to a voice peripheral and records greeting messages.

Step 1. The caller dials the phone number of the user;

Step 2. A telephone switch sends a ring signal to the user's telephone;

Step 3. The user sends a signal to the telephone switch with instructions that an appropriate recorded message be played;

Step 4. The telephone switch invokes an application on a service control point;

Step 5. The service control point instructs the switch to bridge the caller and user to the voice peripheral;

Step 6. The telephone switch bridges the call to the voice peripheral;

Step 7. The voice peripheral signals the service control point that the call has arrived;

Step 8. The service control point instructs the voice peripheral to play the appropriate message;

Step 9. The peripheral plays the message to the caller;

Step 10. The user begins speaking with the caller at anytime.

Optional step: The voice peripheral is dropped from the call.

Figure 3:
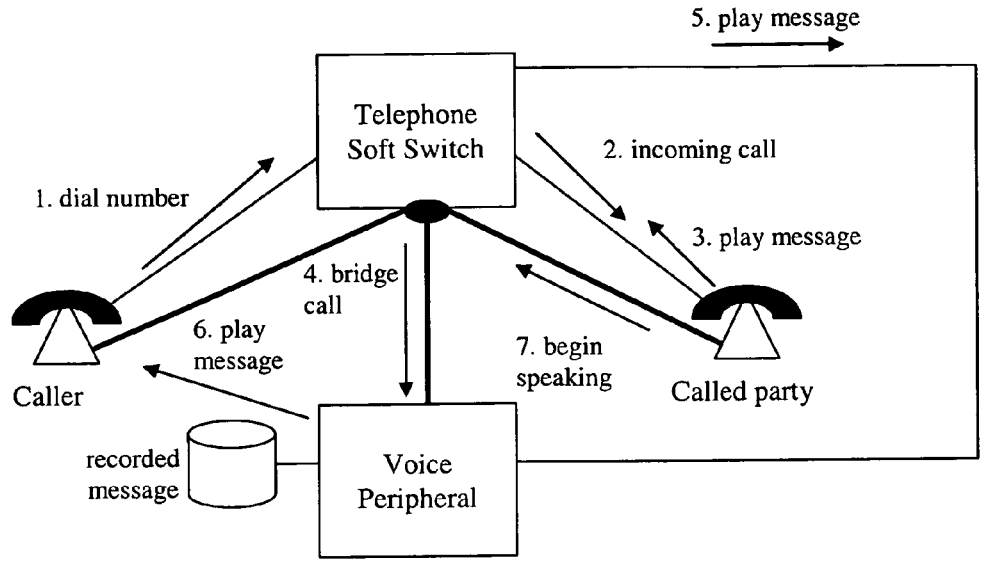
FIG. 3 is a diagrammatic representation of a still further embodiment according to the present invention, showing participating entities and message flow in a centralized system.

FIG. 3 is a diagrammatic representation of a still further embodiment according to the present invention, showing participating entities and message flow in a centralized system. In this embodiment, the following steps are carried out to implement and use the message mode.

As a preliminary step, the user connects to a voice peripheral and records greeting messages.

Step 1. The caller dials the phone number of the user;

Step 2. A soft switch sends a ring signal to user's telephone;

Step 3. The user sends a signal to the soft switch with instructions that an appropriate recorded message be played;

Step 4. The soft switch bridges the caller and user to the voice peripheral;

Step 5. The soft switch instructs the voice peripheral to play the appropriate message;

Step 6 The peripheral plays the message to the caller;

Step 7. The user begins speaking with the caller at anytime.

Optional step: The voice peripheral is dropped from the call.

Figure 4:
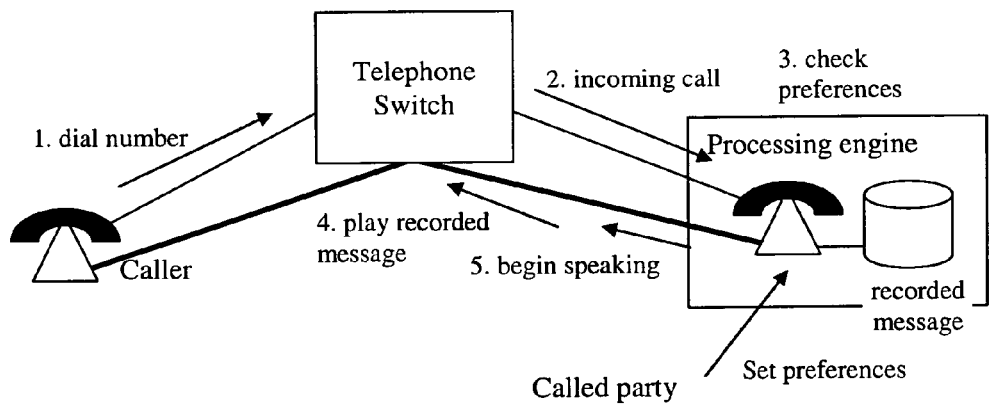
FIG. 4 is diagrammatic representation of a still further embodiment according to the present invention, showing participating entities and message flow when the user's telephone has programmatic capabilities.

FIG. 4 is diagrammatic representation of a still further embodiment according to the present invention, showing participating entities and message flow when the user's telephone has programmatic capabilities. In this embodiment, the following steps are carried out to implement and use the message mode.

As a preliminary step, the user interacts with the software program within the telephone to indicate preferences about how incoming calls should be treated. Specifically, the user records a greeting and indicates the situations under which calls should receive the recorded greeting automatically.

Step 1. The caller dials the phone number of the user;

Step 2. A telephone switch sends a ring signal to the user's telephone;

Step 3. The software program within the user's telephone is triggered by the ring signal. It then checks the user preferences to determine how it should handle the call. The preferences could specify treatment based on caller ID information, the current location of the telephone (provided by a location capability within the telephone or retrieved by the telephone from a network-based location tracking entity), scheduled events stored by an electronic calendar program or other similar factors. For this flow, the software program within the telephone determines that it should play a previously recorded message to the caller and notify the user;

Step 4. The software in the telephone sends a signal to the network that the call should be connected and when the call is connected, the software program plays the message to the caller after which the connection is kept open. While connecting the call to the network, the software program is delivering a notification to the user, such as by ringing the telephone;

Step 5. The user answers the telephone and begins speaking with the caller at anytime.

Figure 5:
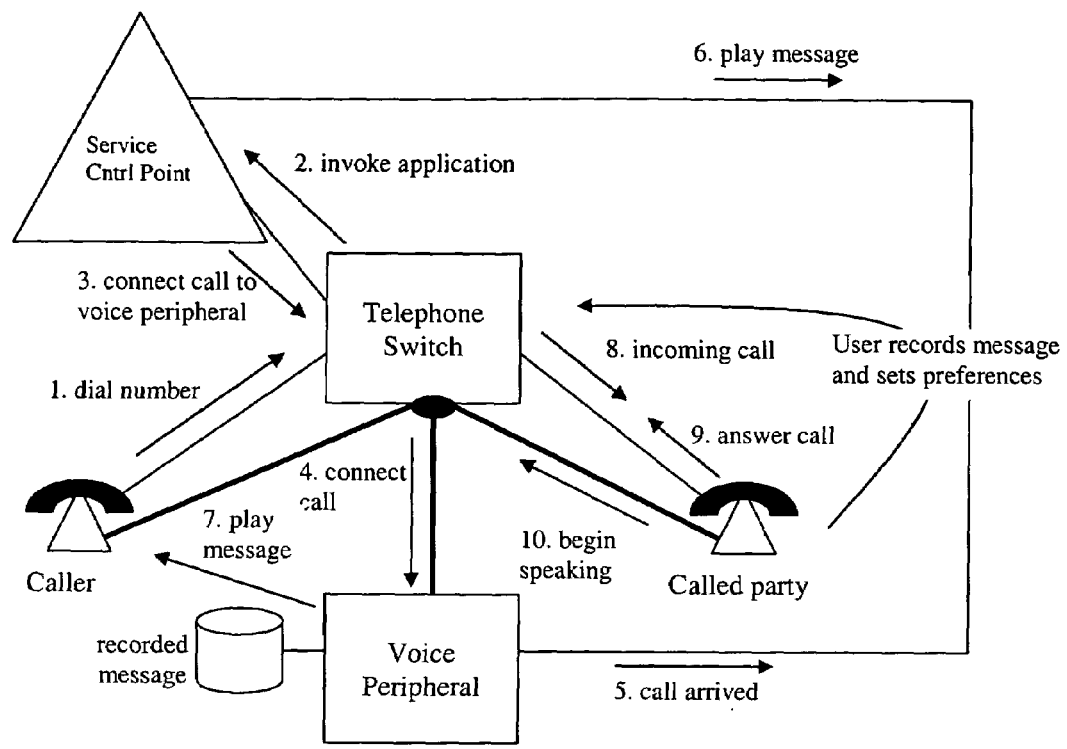
FIG. 5 is a diagrammatic representation of a further embodiment according to the present invention, showing participating entities and message flow in a centralized system when a more automated response is used.

FIG. 5 is a diagrammatic representation of a further embodiment according to the present invention, showing participating entities and message flow in a centralized system when a more automated response is used. In this embodiment, the following steps are carried out to implement and use the message mode.

As a preliminary step, the user connects to a voice peripheral and records greeting messages. In the same interaction, or a separate one, the user specifies preferences for how incoming calls should be treated. Specifically, the user indicates the situations under which calls should receive the recorded greeting automatically.

Step 1. The caller dials the phone number of the user;

Step 2. The telephone switch invokes an application program on a service control point;

Step 3. The application program within the service control point checks the user's preferences to determine how it should handle the call. The preferences could specify treatment based on caller ID information, the current location of the telephone (provided by a location capability within and retrieved by the service control point from the telephone or retrieved from a network-based location tracking entity), scheduled events stored by an electronic calendar program or other similar factors. For this flow, the application program within the service control point determines that it should play a previously recorded message to the caller and notify the user.

The application program instructs the switch to connect the caller to the voice peripheral;

Step 4. The telephone switch connects the call to the voice peripheral;

Step 5. The voice peripheral signals the service control point that the call has arrived;

Step 6. The service control point instructs the voice peripheral to play the appropriate message and instructs the switch to continue call processing;

Step 7. The peripheral plays the message to the caller;

Step 8. A telephone switch sends a ring signal to the user's telephone;

Step 9. The user answers the telephone and the user is bridged onto the call between the caller and the voice peripheral (this occurs when the telephone switch signals the service control point that the call has been answered, and the service control point instructs the telephone switch to bridge the call.);

Step 10. The user begins speaking with the caller.

Optional step: The voice peripheral is dropped from the call.

It is anticipated that other embodiments and variations of the present invention will become readily apparent to the skilled artisan in the light of the foregoing description and examples, and such embodiments and variations are intended to likewise be included within the scope of the invention as set out in the appended claims.

What is claimed is:

1. A distributed system to delay answering a call made to a cellular, said system comprising:

means to record a message to be provided to a caller making calls to said cellular phone; and means to instruct said message to be played to said caller, said means to instruct being selected from the group consisting of a button on said cellular phone, a keypad entry to said cellular phone, an entry on a calendar, an entry on a clock, an entry into a location device, and combinations thereof;

wherein said caller is connected, said message is played, and, after said message is played, said caller remains connected.

2. A centralized system to delay answering a call made to a cellular phone, said system comprising:

means to record a message to be provided to a caller making calls to said cellular phone; and means to instruct said message to be played to said caller, said means to instruct being selected from the group consisting of a button on said cellular phone, a keypad entry to said cellular phone, an entry on a calendar, an entry on a clock, an entry into a location device, a telephone order, an electronic message, a webpage interface, interaction with a service representative, and combinations thereof;

wherein said caller is connected, said message is played, and, after said message is played, said caller remains connected.

3. A method of delaying answering a call made to a cellular phone, said method being carried out on a distributed system and comprising the steps of:

recording a message to be provided to a caller making calls said cellular phone;

instructing said message to be played to said caller, said step of instructing being selected from the group consisting of pushing a button on said cellular phone, entering a command using a keypad of said cellular phone, receiving a command from a calendar, receiving a command from a clock, receiving a command from a location device, and combinations thereof;

connecting to said caller;

playing said message to said caller; and maintaining the connection with said caller after said message has been played.

4. A method of delaying answering a call made to a cellular phone, said method being carried out on a centralized system and comprising the steps of:

recording a message to be provided to a caller making calls to said cellular phone;

instructing said message to be played to said caller; said step of instructing being selected from, the group consisting of pushing a button on said cellular phone, centering a command using a keypad of said cellular phone, receiving a command from a calendar, receiving a command from a clock, receiving a command from a location device, placing a telephone order, sending an electronic message, interacting with a webpage, interacting with a service representative, and combinations thereof;

connecting to said caller;

playing said message to said caller; and maintaining the connection with said caller after said message has been played.

* * * * *